United States Patent
Kastfelt et al.

(10) Patent No.: US 6,328,245 B1
(45) Date of Patent: Dec. 11, 2001

(54) APPARATUS FOR DISPENSING INDIVIDUALLY PREDETERMINED LENGTHS OF A WEB MATERIAL

(75) Inventors: Svend-Ove Kastfelt; Bent Nielsen; Jan Sterup, all of Roskilde (DK)

(73) Assignees: Jens Reumert, London (GB); Jan Sterup, Roskilde (DK)

(*) Notice: Subject to any disclaimer, the term of this patent is extended or adjusted under 35 U.S.C. 154(b) by 0 days.

(21) Appl. No.: 08/952,803

(22) PCT Filed: May 14, 1996

(86) PCT No.: PCT/DK96/00213

§ 371 Date: Mar. 5, 1998

§ 102(e) Date: Mar. 5, 1998

(87) PCT Pub. No.: WO96/36549

PCT Pub. Date: Nov. 21, 1996

(30) Foreign Application Priority Data

May 15, 1995 (DK) .................................................. 0554/95

(51) Int. Cl.⁷ ............................. B65H 23/06; B65H 26/06
(52) U.S. Cl. .................. 242/420.3; 242/563; 242/563.2; 242/564.5; 242/566
(58) Field of Search .............................. 242/420.3, 563.2, 242/564.5, 566, 563

(56) References Cited

U.S. PATENT DOCUMENTS

| 4,004,748 | 1/1977 | Schwarz . |
| 4,273,300 | * 6/1981 | Wojtowicz et al. ............... 242/563.2 |
| 4,809,921 | 3/1989 | Dueck et al. . |

FOREIGN PATENT DOCUMENTS

| 0578903 | 1/1994 | (EP) . |
| 0104020 | 3/1994 | (EP) . |
| 748272  | 7/1933 | (FR) . |
| 1206710 | 9/1970 | (GB) . |

* cited by examiner

*Primary Examiner*—John Q. Nguyen
(74) *Attorney, Agent, or Firm*—Birch, Stewart, Kolasch & Birch, LLP

(57) ABSTRACT

An apparatus for automatically dispensing individually predetermined lengths of a web material, such as textile, from a bolt of same. An inclined transport surface conveys a bolt introduced by a customer towards a flip-over mechanism including rods on chains, the textile thereby being unwound from the bolt, the length of the unwound textile being measured by a rotative measuring device, the predetermined length of textile being severed by a severing device. The separated length is delivered to the customer for removal from the apparatus in folded condition together with the bolt in a receptacle displaceable along rails.

41 Claims, 11 Drawing Sheets

APPARATUS FOR DISPENSING INDIVIDUALLY PREDETERMINED LENGTHS OF A WEB MATERIAL

BACKGROUND OF THE INVENTION

1. Field of the Invention

The present invention relates to an apparatus for dispensing individually predetermined lengths of a web material, such as textile materials, wallpaper and the like from a roll of wound web material.

2. Description of Background Art

When dispensing lengths of such web material in retail vending operations it is quite time-consuming to manually release the required length of web material from the roll, manually measure the length required and manually sever the length from the roll. Furthermore, the accuracy of the manual measuring and severing depends on the particular person performing these operations. Apart from the quite large variations in accuracy because of individually varying degrees of care, skill and concentration, the manual process itself is quite inaccurate, particularly when the lengths involved require a plurality of repeated measuring operations, and even more so when the roll is unwieldy. Because of these inaccuracies, and the requirement inherent in the use of such web materials that the length should not be shorter than requested by the customer, it is necessary to systematically dispense lengths longer than requested. This factor, together with unavoidable mistakes in manual severing and measuring causing wastage represent a considerable loss, particularly when the web materials involved are costly.

Commonly, the web materials in question are stocked wound into rolls with a central core, such as bolts of cloth, fabric and the like. Such rolls, particularly bolts of cloth or fabric, may depart substantially from a circular cylindrical shape, for instance having a rectangular cross-section with rounded corners. To achieve the automatic release of web material from such uncircular cylindrical rolls special unwinding means must be employed.

An apparatus of the type mentioned above is known from U.S. Pat. No. 4,004,748 which discloses unwinding conveying means comprising an unwinding cradle for a bolt of fabric having an oblong cross-section, said cradle being constituted by a loop of an endless driven belt supported by and depending from two guides that are relatively movable towards and away from each other as the bolt rotates, the guides moving relatively away from each other as the bolt rotates to a horizontal position and toward each other as the bolt rotates away from the horizontal position. The frequency of the cyclical widening and narrowing of the unwinding cradle in relation to the conveying speed of the endless belt sets limits for the variation of the cross-sectional dimensions of the bolts to be unwound which does not allow all common bolt sizes to be dealt with. Furthermore, when the web material is to be unwound from the bolt, the leading end and a considerable adjacent length of web material must be unrolled and placed correctly over the downstream guide to ensure correct unwinding. This is difficult, particularly for inexperienced customers in a retail operation, and the weight of some bolts will practically render this operation impossible for persons with slight physical strength.

SUMMARY OF THE INVENTION

A main object of the invention is to reduce the incidence of manual operations and replace them by simple, accurate and automatically operating mechanical means capable of accommodating all common rolls of web material such as textile, cloth, wallpaper or the like. This is obtained according to the invention by said apparatus comprising unwinding means (e.g. 5–7) for unwinding a length of web material from the roll, the unwinding means comprising unwinding conveying means (e.g. 5–7) and an unwinding surface adapted to support the roll arranged transversely to the conveying direction of the unwinding conveying means, conveying means (e.g. 31–36, 42–44, 62, 63) for conveying the unwound lengths of web material to separating means for separating the predetermined lengths of web material from the roll and measuring means for measuring the length of web material conveyed to the separating means.

To facilitate the unwinding of the web material from the roll, restraining means (e.g. 10–12, 56–60) for restraining movement of the roll are preferably provided adjacent to the unwinding surface, and the unwinding surface is preferably inclined upwards in the conveying direction of the unwinding conveying means.

Advantageously, the unwinding surface comprises conveying means for conveying the unwound web material and the roll. Preferably, the unwinding surface constitutes at least a part of the unwinding conveying means.

In a simple embodiment of the invention, the restraining means may comprise inhibiting means (e.g. 10, 56) inhibiting movement of the roll in the conveying direction of the unwinding conveying means. To deal effectively with rolls having cross-sections departing substantially from the circular form, the restraining means preferably comprise influencing means (e.g. 10, 58) influencing the roll in a direction generally opposite the conveying direction of the unwinding conveying means. To overcome the resistance against rolling inherent in the non-circular cross-section of some rolls, the influence on the roll by the influencing means preferably has a vertical component.

The restraining means may be arranged to influence the rolls substantially continuously. However, the restraining means are advantageously arranged to interact intermittently with the roll, and they preferably comprise one or more influencing elements arranged to intermittently intersect the path of the roll conveyed by the unwinding conveying means.

The elements may be arranged to move in different manners to achieve this end, for example moving to and fro along a linear or arcuate path, and the elements may be of a variety of shapes and sizes such as, for example, rounded projections on a bar or paddle shaped members. However, in an embodiment the one or more influencing elements are arranged for movement in a closed trajectory positioned such that the movement of the one or more influencing elements at a point of the trajectory intersecting the path of a roll conveyed by the unwinding means is substantially opposite the conveying direction of the unwinding conveying means and has a vertical component. Preferably, the influencing elements are one or more rods longer than the maximum possible width of the web material.

So as to ensure an efficient automatic unwinding and conveying of different types of web material the surface of the unwinding conveying means and/or the conveying means of the unwinding surface engaging the web material and the roll have a configuration adapted for frictionally engaging the web material.

The conveying means of the unwinding surface for assisting in the release of the web material from rolls and conveying the web material away from the rolls may comprise driven rollers or an endless belt looping around driven rollers. However, in an embodiment the conveying means of the unwinding surface comprise a plurality of spaced, flexible endless strips having their upper portion extending along and defining the unwinding surface and extending around and engagingly cooperating with two spaced rollers respectively defining the upstream and downstream edges of the unwinding surface, the surface of the flexible strips facing the web material having a configuration adapted for frictionally engaging the web material.

When conveying rollers are employed to convey web material, and particularly when the conveying direction is changed at the roller, the web material stiffness, the inertia of the moving web material, the influence of static electricity and other factors may cause the web material to stray from the shortest possible path in an unpredictable and varying manner both when moving onto the roller and when leaving it, thus giving rise to inaccuracies in the subsequent measuring process and, in some cases, for example when dealing with thin fabrics, causing unpredictable trajectories for the conveyed web material. Therefore, it is advantageous that means are provided to influence the web material against at least one first portion of the cylindrical surface defined by the rotation of the surface of the roller defining the downstream edge of the unwinding surface and/or means are provided to influence the web material away from at least one second portion of the cylindrical surface.

In an embodiment of the invention, means are provided to attract the web material to at least one first portion of the cylindrical surface defined by the rotation of the surface of the roller defining the downstream edge of the unwinding surface and/or means are provided to repel the web material from at least one second portion of the cylindrical surface.

In alternative embodiments of the apparatus according to the invention it is advantageous to provide, downstream from the unwinding surface, at least one roller and means to attract the web material to at least one first portion of the cylindrical surface defined by the rotation of the surface of the roller and/or means to repel the web material from at least one second portion of the cylindrical surface.

Preferably, the roller is hollow and is provided with apertures communicating with one or more regions in the interior thereof, each of said regions communicating either with means to decrease the air pressure in that region or with means to increase the air pressure in that region, and advantageously the roller is rotatably journalled on a fixed body comprising means for increasing and decreasing the air pressure in the regions in the hollow roller.

The regions inside the hollow roller can be conduits extending into the hollow roller and having apertures opening adjacent the inner surface of the hollow roller, said conduits communicating with the means comprised by the fixed body for increasing and decreasing the air pressure. However, it is preferable that the fixed body is arranged at least partly inside the roller and is provided with sealing means extending parallel to the axis of rotation of the roller and sealingly engaging the inner surface of the roller, the sealing means defining at least one first region and at least one second region between the inner surface of the roller and the outer surface of the fixed body, the fixed body having means in its interior communicating with the first region and with suction means respectively and means communicating with the second region and with blowing means respectively, and it is advantageous that the fixed body is hollow and has sealing means in its interior defining at least one third and one fourth region, the third region communicating with the first region through at least one aperture in the fixed body and the fourth region communicating with the second region through at least one further aperture in the fixed body. A simple manner of achieving the journalling of the hollow roller on the fixed body is obtained by the fixed body being constituted by a hollow cylinder having its axis coinciding with the axis of the roller.

In an embodiment of the apparatus according to the invention the hollow roller is rotatably journalled on a fixed hollow inner cylinder provided with sealing means extending parallel to the rotary axis of the roller and sealingly engaging the inner surface of same, said sealing means defining at least one first region and at least one second region between the inner surface of the hollow roller and the outer surface of the inner cylinder, the inner cylinder having sealing means in the interior thereof defining at least one third and at least one fourth region, the third region communicating with the first region through apertures in the inner cylinder and the fourth region communicating with the second region through further apertures in the inner cylinder, the inner cylinder further being closed at each end by closure members, at least one of which having at least one first aperture and at least one second aperture, the first aperture communicating the third region with suction means and the second aperture communicating the fourth region with blowing means.

The measuring means can comprise a variety of means arranged to follow the path of the web material such as, for example, an endless measuring strip engaging the web material and arranged along the path of the web material, for instance on the unwinding surface, and having iron inlays passing by a magnetic sensing means. However, it is preferable that the measuring means comprise rotary measuring means arranged to engage the web material.

To achieve accurate measuring it is preferable that pressure means are provided for pressing the web material against the rotary measuring means. The pressing means may consist of any means allowing the web material to pass between the pressing means and the rotary measuring means without exerting frictional resistance sufficient to cause slippage between the web material and the rotary measuring means, such as, for example, smooth, low-friction, biased plate members or lamella. However, it is preferable that the pressure means (e.g. 35) are rotary with the axis of rotation parallel to the axis of rotation of the rotary measuring means, and it is further preferable that the pressure means are rotary with the axis of rotation parallel to the axis of rotation of the rotary measuring means.

It is a further main object of the invention that the accuracy of the measuring be as precise as possible and inter alia not be influenced by differences in the conveying speed of any conveying elements upstream and downstream from the measuring means as well as by fluctuating tension in the web material caused by the unwinding of the web material from the rolls. This object is achieved according to the invention by forming a buffer of the sheet of web material, the length of the sheet of web material in the buffer fluctuating according to variations in conveying speed and tension of the sheet of web material, the resistance against such fluctuations being substantially constant. This may be achieved in many different manners such as, for example, deflecting the trajectory of the sheet of web material by means of relatively light, easily displaced biased rollers. However, it is preferred that a vertical space is defined between two vertical planes substantially perpendicular to the horizontal component of the web material conveying direction in a region downstream from the unwinding surface, the conveying speed of the web material upstream from the vertical space being controlled in such a manner with relation to the conveying speed of the web material downstream from the vertical space that a depending loop or buffer bulge of web material is formed and maintained in the vertical space.

In an embodiment the rotary measuring means and the pressure means are displaceable from a first, mutually spaced position, the space between them being located in the path of the leading free end of the conveyed web material downstream from the unwinding surface, and a second, mutually abutting position, one of the vertical planes containing the axis of rotation of the rotary measuring means being in said second position and the other vertical plane containing the farthest downstream of the lines constituted by either the downstream edge of the unwinding surface or the axis of rotation of the farthest downstream of any such rollers downstream from the unwinding surface and upstream from the rotary measuring means.

To reduce the danger of slippage of the web material relative to the rotative measuring means it is preferred that the rotary measuring means and the rotary pressure means are rotatively driven in opposite directions and at the same peripheral speed, and it is further preferred that the rotary measuring means and the rotary pressure means each comprise a roller having a length substantially equal to the maximum possible width of the web material.

The measuring of the length of web material for severing is preferably achieved by the measuring means comprising means to measure the peripheral movement of the rotary measuring means, and in an embodiment the measuring means comprise an electrical pulse generator generating an electrical pulse each time the rotary measuring means has rotated through a certain angle.

Preferably, the measuring means comprise sensing means sensing the presence or the absence of the web material at one or more particular locations in the vertical space defined by the two vertical planes, and it is further preferable that the sensing means activate controlling means controlling the conveying speed of the web material upstream from the vertical space. In an embodiment the sensing means further activate controlling means controlling the speed of the web material downstream from the vertical space.

In an embodiment the sensing means activate displacement means displacing the rotary measuring means and the pressure means from a first, mutually spaced position to a second, mutually abutting position.

For delivering the severed length of web material to customers the length can be configured in various manners suitable for removal by the customer such as, for example, winding the length into a roll. However, in an embodiment there are provided, downstream from the measuring means, layering means for depositing the web material in layers in a receptacle, the layering means comprising one or more displacing elements displacing a vertical portion of the web material to and fro in a substantially horizontal direction substantially at right angles to the transverse dimension of the web material. Preferably, receptacle displacing means are provided for displacing the receptacle from a first folding position substantially vertically below the layering means to a second emptying position at a height convenient for manual emptying.

Advantageously, the displacement path of the receptacle between said first and second position may be such that the roll may be deposited in the receptacle when the conveying direction of the conveying means of the unwinding surface is reversed after the separation operation.

The suppliers of the rolls of web material commonly do not pay much attention to, accuracy with regard to the actual length of web material in the rolls supplied, and to avoid annoying and costly problems connected with a shortfall when dispensing the last portion it is advantageous to provide roll measuring means for measuring the amount of web material in the roll.

It is advantageous to provide at least one programmable data processing means for inter alia computing the remaining length of the web material in each roll of web material.

To allow the customer to place the roll of web material in the apparatus in a simple manner with correct positioning on the unwinding surface to allow unwinding of the web material from the roll and to avoid the costly intervention of shop clerks it is advantageous that web material roll identification means are provided for identifying each roll, the identification parameters including at least one of the group of identification parameters comprising material type, material price and the length of the web material originally in the roll, and in an embodiment the identification means comprise a programmable element fixedly attached in a predetermined position on each particular roll, means to programme said programmable element with at least one of the roll identification parameters, remote sensing means to remotely sense the programmable electronic element for sensing the programmed roll identification parameters and the position of the electronic element, means to indicate incorrect positioning of the roll on the unwinding surface based on the position of the electronic element, and transmission means to transmit the sensed roll identification parameters to the programmable data processing means.

An embodiment advantageously comprises input means for manually registering the longitudinal dimension of the length of web material to be severed from the roll and display means for displaying information, the information at least comprising an indication as to whether the roll contains said required length of web material.

To further reduce the intervention of shop clerks it is preferred that the apparatus is provided with web material length identification means for identifying each severed length of web material. The web material length identification means may further comprise printing means for printing web material length identification parameters comprising at least one of the group of identification parameters comprising material type, material unitary price, dimension of the length of severed web material and the total price of the length of severed web material.

To avoid fraud, the web material identification means may comprise printing means to print on tamper-evident labels and means to attach the labels to the severed lengths of web material.

In some cases, the web material is such that it is unsuited for automatic measuring and severing, for instance too fragile or too deformable, and therefore it is advantageous that there are provided manual operating means for manually measuring and severing lengths of web material, and in an embodiment the manual operating means comprise input means for manually registering the longitudinal dimension of the length of web material severed from the roll, remote sensing means to remotely sense the electronic element for sensing the programmed web material roll identification parameters and transmission means to transmit the sensed identification parameters to the programmable data processing means, printing means for printing identification parameters comprising at least one of the group of identification parameters comprising web material type, material unitary price, dimension of the length of severed web material and the total price of the length of severed web material.

According to a further aspect, the present invention also relates to a roller comprising means to attract the material to at least a first portion of the cylindrical surface defined by the rotation of the surface of the roller and/or means to repel the material from at least a second portion of the cylindrical surface.

In continuation of the features of the invention directed towards the object of the invention of increasing the efficiency in retail operations related to web materials such as textiles, wallpaper and the like, a further aspect of the invention relates to an integrated stock controlling system for a stock of web material such as textiles, wallpaper and the like wound on rolls, the system comprising at least one programmable data processing means comprising a database and communicating with and receiving data from data input and generating means associated with at least one of:

roll content checking means, dispensing means for dispensing individually predetermined lengths of the web material from the rolls, a cash register for recording sales of said lengths of web material and a stock replenishing order placement system for ordering new supplies of web material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be further explained with reference to the accompanying drawings, wherein.

DETAILED DESCRIPTION OF THE PREFERRED EMBODIMENT

Figure 1:
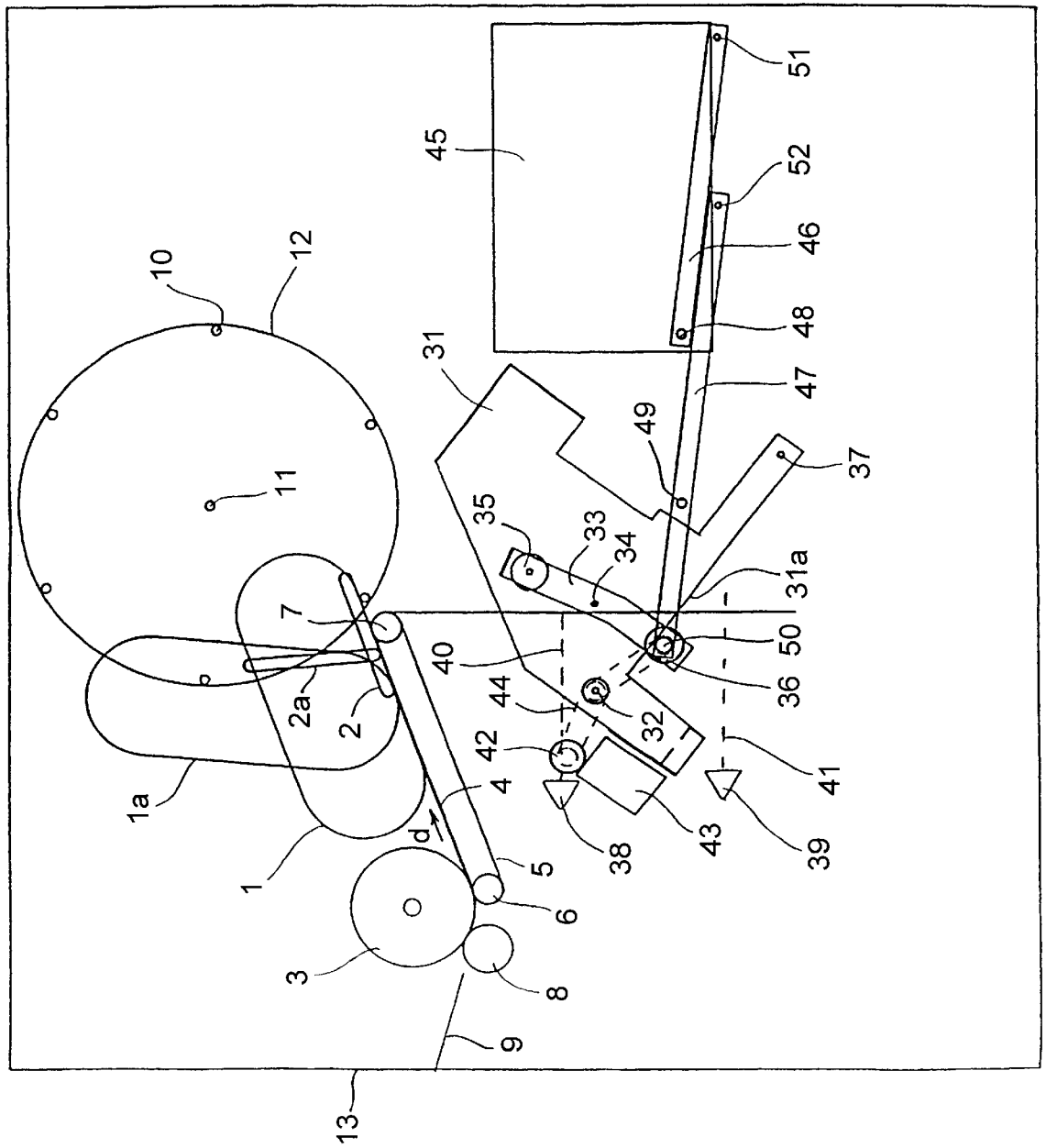
FIG. 1 is a diagrammatic, partial lateral sectional view of a first embodiment of the apparatus according to the invention, shown at an early stage in the measuring and severing process.
Figure 2:
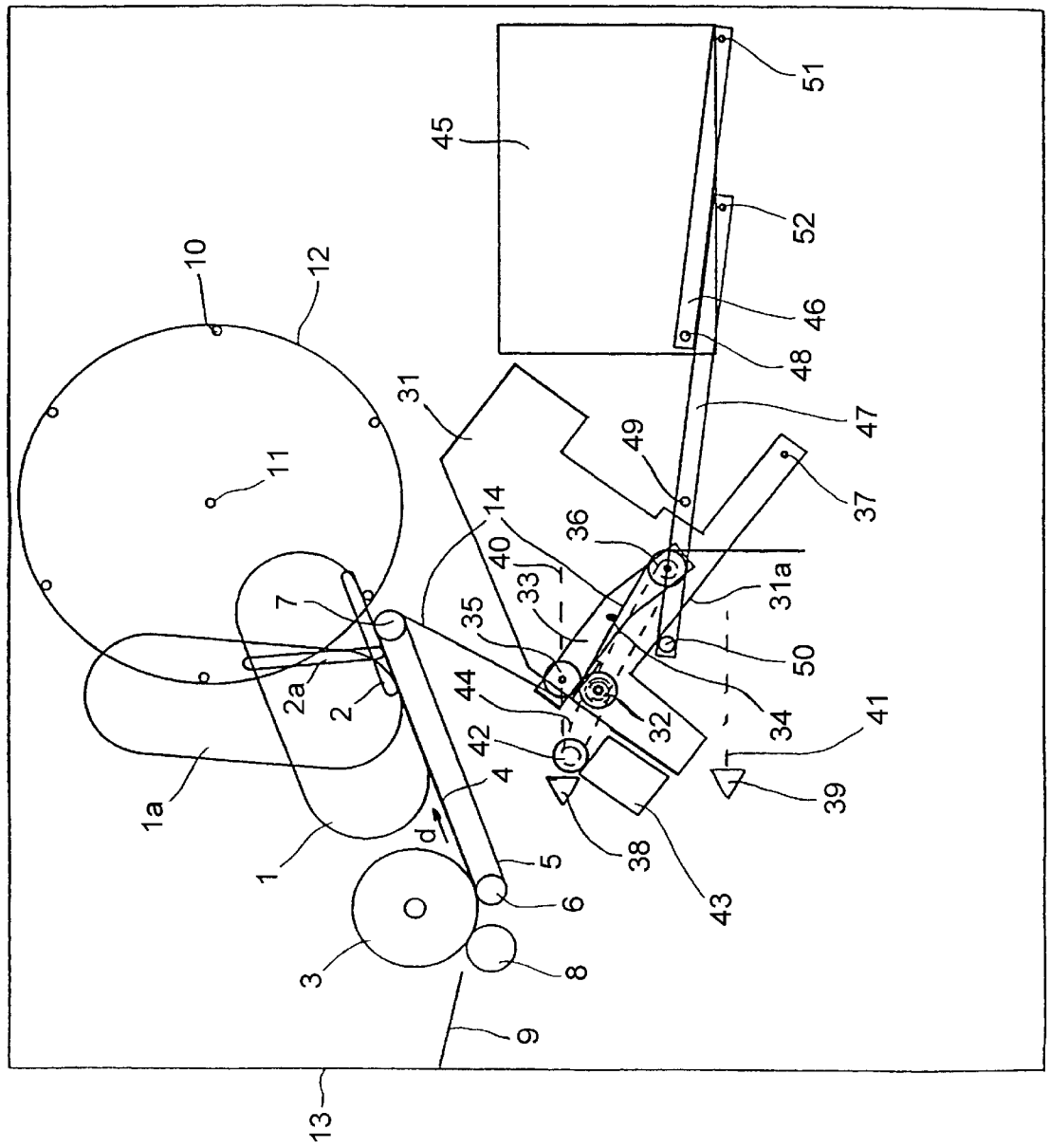
FIG. 2 is a view similar to FIG. 1, the apparatus being at a later stage in the process.
Figure 3:
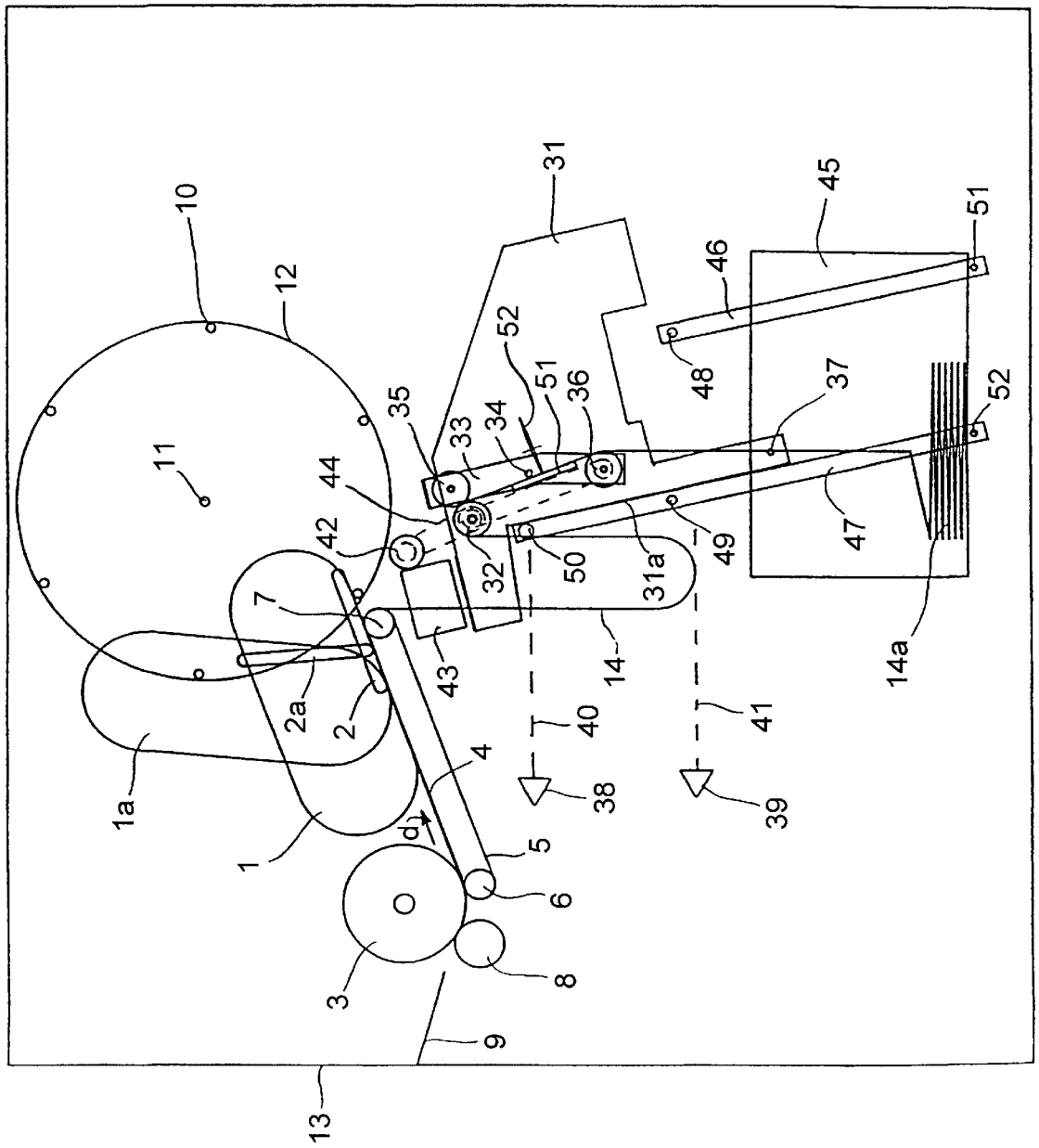
FIG. 3 is a view similar to FIG. 1 and 2, the apparatus being at an even later stage in the process.

Referring to FIGS. 1–3, bolts of web material such as cloth, fabric, textile, wallpaper or the like are shown with three alternative configurations 1, 1a; 2, 2a; and 3. The bolt 1, 1a, the reference numeral 1 denoting a first position on an inclined surface 4 and the reference numeral 1a denoting a second such position, has a cross-section typical of bolts of cloth and the like where the web material is wound on a core with a rectangular cross-section. The bolt 2, 2a has a similar shape but contains either less or thinner web material, while the bolt 3 is wound on a core with a circular cross-section.

The inclined surface 4 is defined by spaced endless-flexible strips 5 extending around substantially horizontal rollers 6 and 7 defining a lower, upstream edge and an upper, down-stream edge, respectively, of the inclined surface 4. The roller 6 is rotated clockwise and causes the upper portions of the strips 5 to move in the conveying direction of the web material as indicated by the arrows d.

A roller 8 is arranged adjacent to the roller 6 and a cradle-like space is defined therebetween. A plate 9 is arranged higher than and sloping down towards the roller 8. Rods 10 with a substantially circular cross-section are connected to and arranged between two circular plates 12 mounted on a rotary axle 11. The length of the rods is longer than the maximum possible width of the web material. The circular plates 12 rotate clockwise so that the rods 10 intersect the path of the bolts 1, 2 conveyed by the endless strips 5.

The bolt 1, 2, or 3 is introduced by the customer into the housing 13 of the apparatus through an aperture (not shown) and is placed in the region comprising the plate 9, the rollers 8 and 6 and the lower portion of the inclined unwinding surface 4 with the orientation of the bolt such that counter-clockwise rotation of same will unwind the web material 14 from the bolt. Means to ensure that this requirement is complied with are provided and will be described in the following.

When the unwinding and conveying operation starts, the bolt 3 with a generally circular cross-section will remain in the cradle between the rollers 8 and 6 and will rotate counter-clockwise under the combined influence of the endless strips 5 and the force of gravity, and the web material 14 will be unwound from the bolt 3 and conveyed by the strips 5 having a surface with a high coefficient of friction. The bolts 1 or 2, respectively, are conveyed by the strips 5 until they project beyond the roller 7 into the path of the rods 10. The rods 10 lift and, in cooperation with the motion of the strips 5, rotate the bolts 1 or 2 counter-clockwise through the positions denoted by the reference numerals 1a or 2a, respectively, until they have rotated half a revolution whereafter the process is repeated. The web material 14 is thus unwound from the bolt 1 or 2 and conveyed onwards.

The roller 7 receives the web material from the endless strips 5, and the conveying direction of the web material is altered so that it leaves the roller 7 vertically downwards. To intercept the leading edge of the web material 14 and ensure that the web material follows the contour of the roller 7 and does not overshoot because of web material stiffness or inertia or cling to the roller 7 because of static electricity, the cylindrical surface described by the surface of the roller 7 during its rotation has a sucking region where the web material is sucked against the surface of the roller, thereby effectively engaging the web material 14, eliminating tendencies to overshoot and ensuring an effective alteration of the conveying direction. The sucking region extends substantially over the upper half of the cylindrical surface. The lower half of the cylindrical surface is a blowing region where the web material is blown away from the surface of the roller, i.e. as soon as the desired conveying direction has been obtained, thereby eliminating tendencies to cling to the roller.

Figure 4:
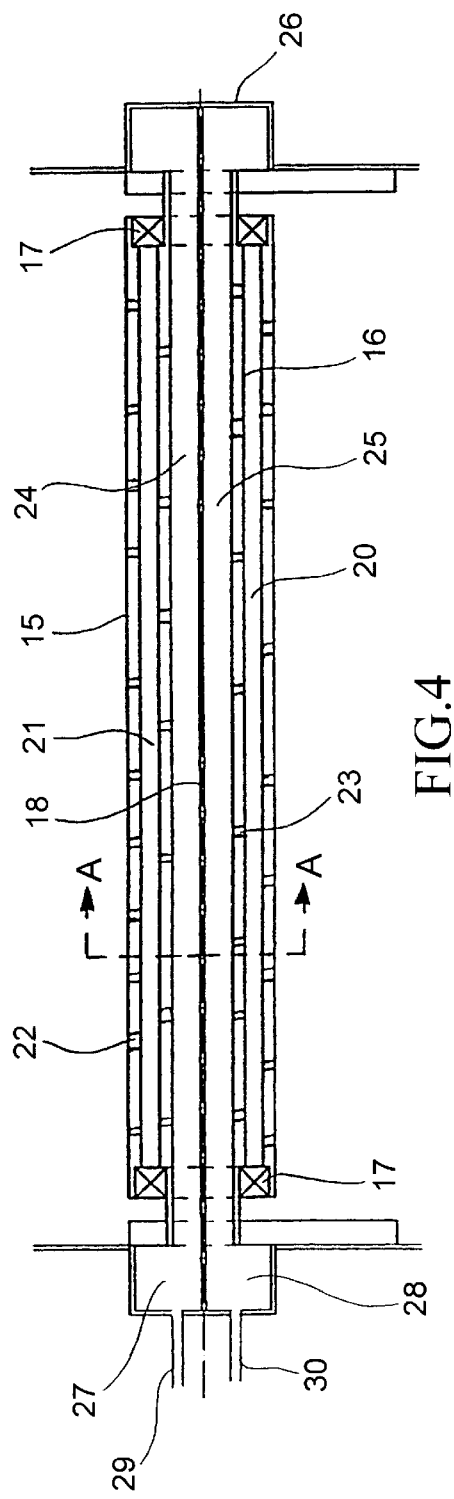
FIG. 4 is an enlarged longitudinal sectional view of an embodiment of a roller according to the invention and FIG. 5 is a cross-sectional view along line A—A in FIG. 4
Figure 5:
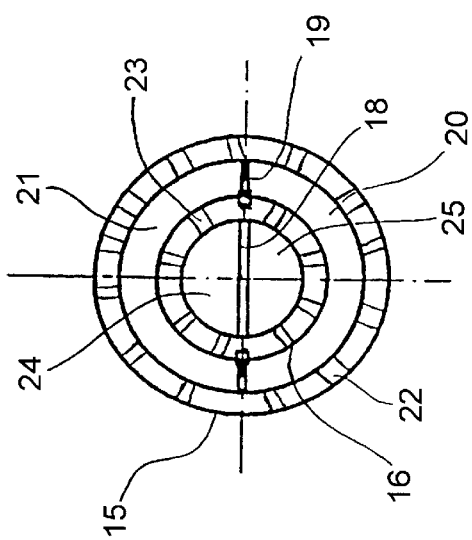
Figure 6:
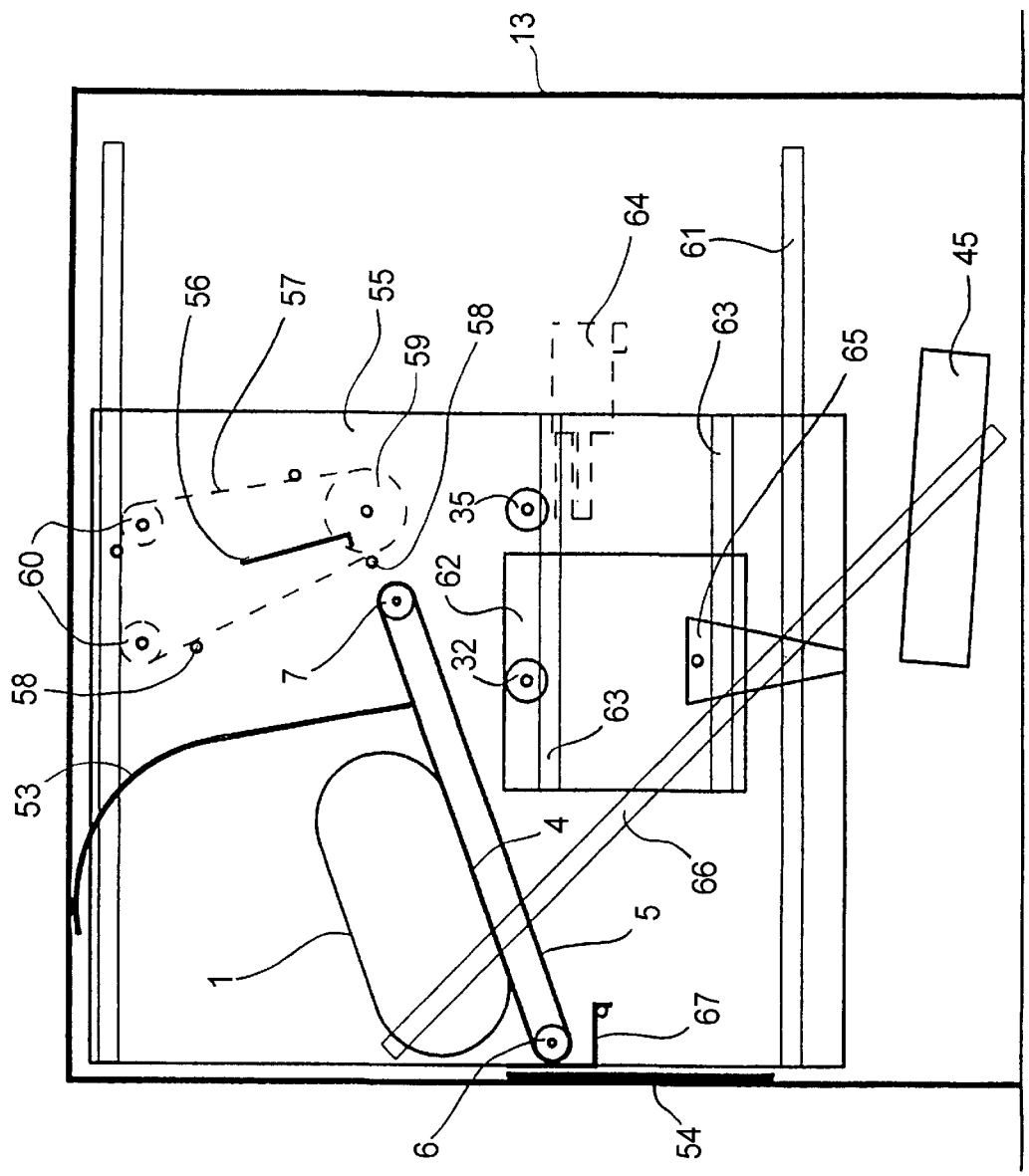
FIGS. 6–11 are views similar to FIGS. 1–3 of a second embodiment of the apparatus according to the invention at various successive stages of the process.

An embodiment of the roller 7 is illustrated in FIGS. 4–5. An outer rotary hollow cylinder 15 is journalled on an inner fixed hollow cylinder 16 by means of bearings 17. The interior of the fixed cylinder 16 is divided into two regions 24 and 25 by an airtight partition 18 fixedly arranged on the interior surface of the inner cylinder 16, for instance by means of friction between the partition 18 and said inner surface. Sealing strips 19 are fixed in slots in the outer surface of the inner cylinder 16 and extend radially outward to engage the inner surface of the outer cylinder 15. The strips 19 are flexible and bear against the inner surface of the outer cylinder 15 so that a substantially airtight partition is formed dividing the region between the outer cylinder 15 and the inner cylinder 16 into two regions 20 and 21.

Apertures 22 extending through the shell of the outer cylinder 15 are distributed over the entire extent of the cylinder. Apertures 23 extending through the shell of the inner cylinder 16 are distributed over the portion of the cylinder extending between the bearings 17. At each end the inner cylinder 16 is connected to a chamber defined by a plate 26 and divided into two regions 27 and 28 by the partition 18. The region 27 communicates with a conduit 29 communicating 5 with suction means (not shown). The region 28 communicates with a conduit 30 communicating with blowing means (not shown). The angular position of the assembly comprising the inner cylinder 16, the partition 18, the strips 19, the plate 26 and the conduits 29 and 30 may be adjusted so that the planes containing the partition 18 and the strips 19 can form any angle with the horizontal plane.

The outer surface of the outer cylinder 15 has circumferential grooves (not shown) with a width equal to the width of the endless strips 5. The grooves receive the endless strips 5 and fix them axially with respect to the outer cylinder 15 to preserve the spacing between them.

In operation, the suction means cause air to be sucked through the apertures 22 into the region 21 by lowering the pressure in said region by sucking air away from it through the apertures 23, the region 24 and the conduit 29. The blowing means cause air to be blown through the apertures 22 from the region 20 by increasing the pressure in said region by blowing air into it through the apertures 23, the region 25 and the conduit 30.

As the outer cylinder 15 rotates, each of the apertures 22 will alternate between sucking air into the cylinder and expelling air from the cylinder according to whether it communicates with region 21 or with region 20, respectively. Thus, the sucking and blowing regions of the circumference of the cylindrical surface described by the surface of the roller 7 during its rotation are formed.

The angular positions of these regions can be adjusted by adjusting the angular position of the inner cylinder 16. The relative size of these regions can be altered by altering the angular position of the sealing strips 19 on the inner cylinder 16.

Referring again to FIGS. 1–3 two spaced plates 31 are arranged below the circular plates 12, the distance between the plates 31 being large enough to allow the widest possible web material to be conveyed between them. The plates 31 form a frame which is pivotable about pins 37 from a first web material capturing position shown in FIGS. 1 and 2 to a measuring and severing position shown in FIG. 3. A measuring roller 32 is rotatably mounted on and extends between the two plates 31. A rocker arm 33 is pivotally arranged about a pin 34 on each of the plates 31. A pressure roller 35 is rotatably mounted on and extends between the upper ends of the two rocker arms 33. A displacing roller 36 is rotatably mounted on and extends between the lower ends of the two rocker arms 33.

Two photoelectric cells 38 and 39 are arranged at two levels, the lines of activation 40 and 41, respectively, of the cells 38 and 39 intersecting the web material conveying path vertically below the roller 7.

A pulley 42 driven by an electric motor 43 rotates the measuring roller 32 and the displacing roller 36 by means of a belt drive 44. The displacing roller 36 rotates the pressure roller 35 by means of another belt drive (not shown). Hereby the measuring roller 32, the displacing roller 36 and the pressure roller 35 rotate with the same peripheral speed, the direction of rotation of the pressure roller 35 (counter-clockwise) being the opposite of that of the two other rollers (clockwise).

A receptacle 45 for layered or folded web material 14a is carried by two pairs of rods 46 and 47 journalled in the housing by means of pins 48 and 49, respectively. The rods 47 engage the plates 31 by means of pins 50 that abut engagement edge portions 31a of the plates 31. The receptacle 45 is pivotally attached to the arms 46 and 47 by means of pins 51 and 52, respectively.

Referring now to FIG. 1, the leading edge of the web material 14 has left the roller 7 and has descended through the space between the measuring roller 32 and the pressure roller 35, said rollers being in an initial, spaced position where the plate 31 is in its folded web material delivery position where the receptacle 45 is positioned for easy removal of the web material severed and layered in the preceding dispensing cycle.

When the leading edge of the web material 14 intersects the line of activation of the photosensitive cell 39 a signal from the cell 39 activates pivoting means (not shown) to pivot the arms 33 about the pins 34 so as to cause the pressure roller 35 to abut the measuring roller 32 with the web material 14 pressed between said two rollers as shown in FIG. 2. The displacing roller 36 displaces the leading edge of the web material 14 so that it will be positioned above the receptacle 45 in the layering position thereof with sufficient lateral clearance for the layering operation as shown in FIG. 3.

In the following step pivoting means (not shown) pivot the plates 31 about the pins 37 into the position shown in FIG. 3 thereby laterally displacing the pressure roller 35 and measuring roller 32 with the web material 14 clamped therebetween into the measuring and severing position thereof. A vertical space is created between the roller 7 and the measuring roller 32.

The initial conveying speed of the unwinding surface defined by the rollers 6 and 7 and the strips 5 is higher than the conveying speed of the measuring roller 32 and pressure roller 35 so that a loop of the web material 14 is formed in said vertical space. The loop develops downwards until the web material intersects the line of activation of the cell 39 as shown in FIG. 3 whereupon a signal from the cell 39 stops or slows the conveying action of the unwinding surface 4 so that the conveying speed of the measuring roller 32 and pressure roller 35 is higher than the conveying speed of the unwinding surface 4. This causes the height of the depending loop of web material 14 to decrease until the lowest portion of the loop moves above the line of activation of the photosensitive cell 38, whereupon a signal from the cell 38 restores the conveying speed of the unwinding surface 4 to its initial value, whereupon the height of the loop of web material increases again.

The loop of web material serves as a tension equalizing buffer to practically eliminate any variations in the tension of the web material 14 when engaging the measuring roller 32 so that no slippage giving rise to measuring errors can occur therebetween.

When the plates 31 pivot into the measuring and severing position of FIG. 3 the receptacle 45 is swung into its layering position by means of interaction between the engagement edge portions 31a of the plates 31 and the pins 50. The receptacle 45 swings down under the influence of gravity as the plates 31 pivot, the arms 46 and 47 pivoting about the pins 48 and 49, respectively and the pins 50 sliding downwards along the edge portions 31a. The receptacle is swung into its folded web material delivery position shown in FIGS. 1 and 2 when the plates 31 pivot counter-clockwise and the edge portions 31a exert pressure on the pins 50 whereby the arms 46 and 47 pivot and the pins 50 slide upwards on the edge portions 31a.

Severing means are provided between the measuring roller 32 and the displacement roller 36 and they comprise a plate element 51 attached to and extending between the rocker arms 33 and having a rectilinear notch (not shown) with a length at least equal to the maximum possible width of the web material 14 and extending substantially at right angles to the conveying direction of the web material 14 and a circular knife 52. The circular knife 52 is rotatable and displaceable into cutting engagement with the notch in the plate element 51 and when in engagement with the notch it is furthermore displaceable along the notch for cutting the web material 14 clamped between the knife 52 and the plate element 51.

The measuring roller 32 emits 200 electrical pulses pr. revolution, each pulse representing the same amount of angular movement of the roller 32. The desired length of web material to be unwound, measured, severed and folded is by the customer read into a programmable data processing means by means of a keyboard. The amount of pulses emitted by the measuring roller 32 from the moment it abuts the pressure roller 35 and clamps the web material 14 therebetween is a measure of the amount of web material having passed by the measuring roller and this measure is via means well known in the art compared with the desired length until the correct measure has been achieved taking into consideration the distance from the leading edge of the web material 14 to the severing means at the moment of starting the measuring process. When the correct measure has been achieved the measuring roller 32 is stopped and the knife 52 is displaced for engagement with the notch in the plate 51 and thereafter displaced along the notch thereby severing the web material 14.

Web material layering displacement means (not shown) for rhythmically displacing the web material 14 horizontally to and fro in a direction at right angles to the axis of the displacement roller 35 are arranged between the displacement roller 35 and the receptacle 45. During the measuring operation said layering displacement means swing the web material 14 to and fro so as to, in cooperation with the downward movement of the web material, build up the layers of folded web material 14a in the receptacle 45.

When the layered web material has been removed from the receptacle and a new roll is about to be inserted in the apparatus through the aperture in the housing 13, said aperture being closed by a locked, hinged plate (not shown), the lock being controlled by the data processing means, the conveying direction of the unwinding surface 4 is reversed so that the bolts 1 or 2 are displaced until abutting the roller 8 whereafter the plate 9 and said roller are displaced downwards so as to allow the roll 1, 2 or 3 to fall into the bottom of the apparatus for periodic removal by a sales clerk through another aperture (not shown) in the housing.

Referring now to FIGS. 6–11, a second embodiment of an apparatus according to the invention is shown, similar elements having the same reference numerals as in FIGS. 1–3.

An apparatus casing 13 has an aperture for inserting a bolt of web material 1 and a swingable and a displaceable closure element 53 and 54, respectively, for closing the aperture in the casing during operation of the apparatus.

The bolt is placed on an inclined surface 4 defined by 20 endless flexible strips 5 extending around rollers 6 and 7 as in FIGS. 1–3. The rollers 6 and 7 are pivotably attached to two spaced plate members 55 that are slidably arranged on track members 61 fixedly attached to the casing 13.

A set of sprocket wheels 59 and 60 are rotatably arranged on each plate member 55 for driving a chain 57 for each set. Spaced rods 58 are attached at either end thereof to the chains 57. An abutment plate 56 is fixedly arranged on the plate members 55 extending therebetween. A pressure roller 35 and a web severing device 64 are arranged on and between the plate members 55.

A second slidable plate member 62 is slidably arranged on track members 63 on each of the plate members 55. A web measuring roller 32 and a web layering funnel 65 are pivotably arranged on the plate members 62 extending therebetween.

Figure 7:
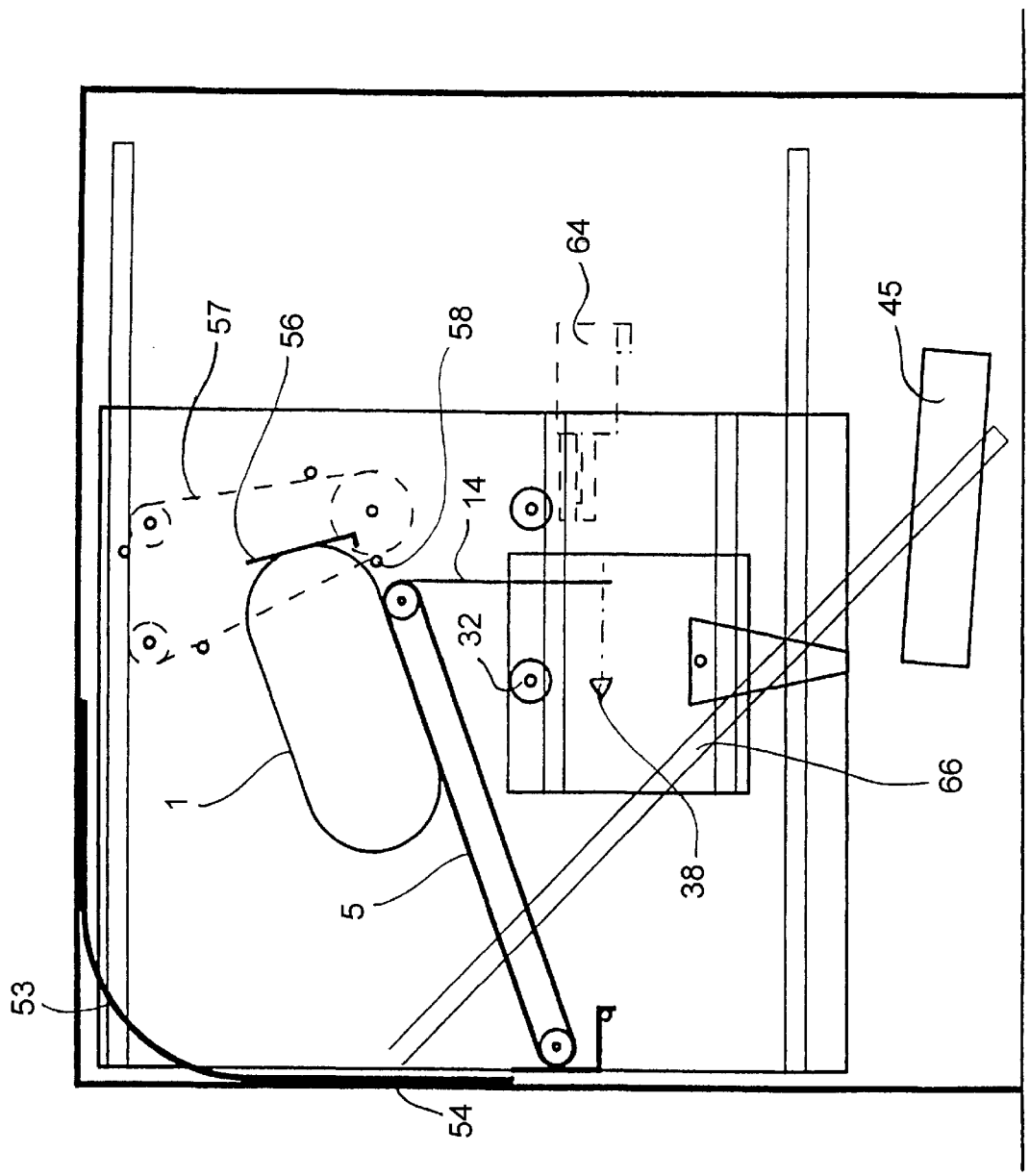

A receptacle 45 for layered web material is slidably arranged on inclined track members 66 arranged on walls of the casing 13. An abutment member 67 is pivotably arranged on the plate members 55 extending therebetween. In operation, the closure elements 53 and 54 are opened from the closed position thereof shown in FIG. 7 to the open position thereof shown in FIG. 6. The bolt 1 of textile is placed on the inclined surface 4 with the free end of the web on the surface 4 and pointing away from the aperture in the casing 13. The closure elements 53 and 54 close the aperture, and the bolt is transported by the flexible strips 5 upwards along the surface 4 until the bolt abuts the abutment plate 56 as shown in FIG. 7. In this position, the sprocket wheels 59 and 60 start moving the rods 58 on the chains 57 clockwise thereby lifting the bolt 1 at its forward end, the continued movement of the strips 5 and the lifting action of the rod 58 cooperating to overturn the bolt 1 so that web material 14 is unwound therefrom and depends from the roller 7.

A photosensitive cell 38 senses whether the web material 14 has passed through its sensing area within a predetermined time period after closing the closure elements 53 and 54. If so, the operation continues. If not, the operation is discontinued and the strips 5 reverse, thereby returning the bolt to its original position and an alarm indication is generated to indicate error as regards placement of the bolt 1 on the surface 4.

Figure 8:
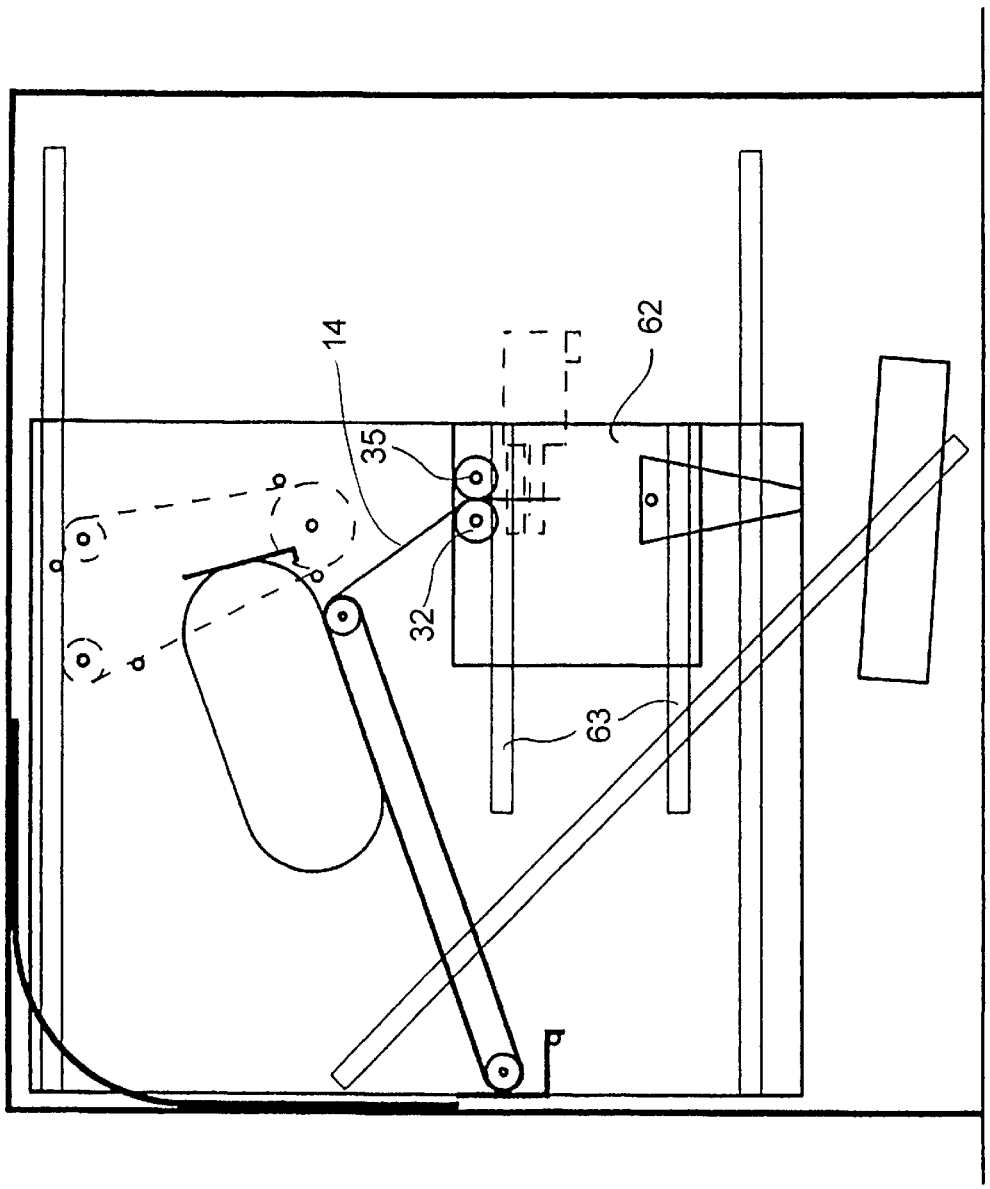

If operation continues, the plate members 62 are displaced along the track members 63 as shown in FIG. 8, thereby pinching the web material 14 between the measuring and pressure rollers 32 and 35.

Figure 9:
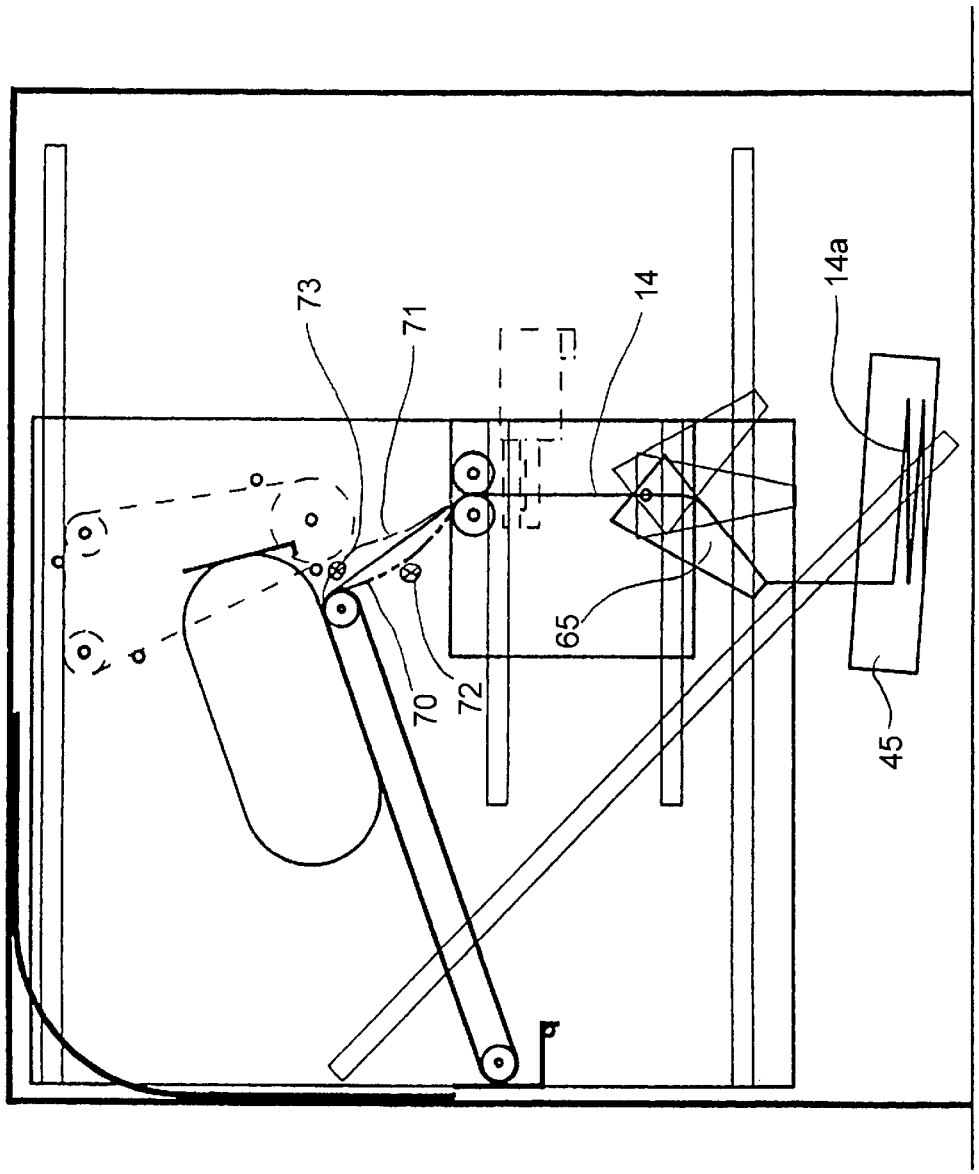

The measuring of the length of web material to be severed commences and the web material 14 is lowered into the funnel member 65 that swings to and fro as indicated in FIG. 9 so as to deposit the web material in layers 14a in the receptacle 45. As the web material 14 moves from the roller 7 to the rollers 32, 35 either a depending loop 70 or a projecting bulge 71 of the web material 14, depending on the stiffness of the web material, will be formed because of slightly higher conveying speed of the flexible strips 5 and roller 7 than the conveying speed of the rollers 32, 35.

Photosensitive cells 72 and 73 having a direction of activation substantially parallel to the axes of the rollers 7, 32 and 35 are located such that the conveying speeds may be adjusted whenever the loop 70 or bulge 71 surpasses the size that activates the cell 72 or 73.

Figure 10:
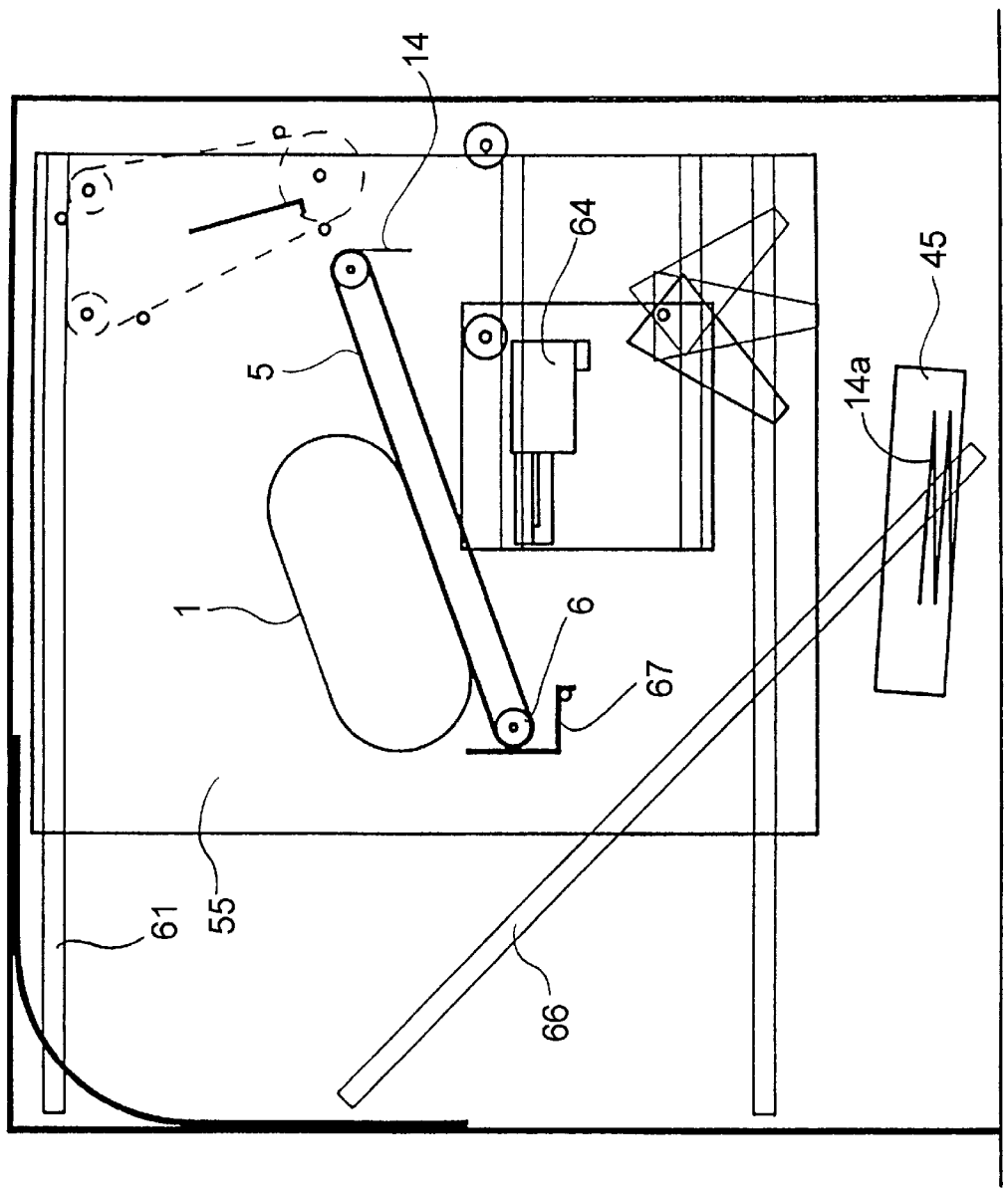
Figure 11:
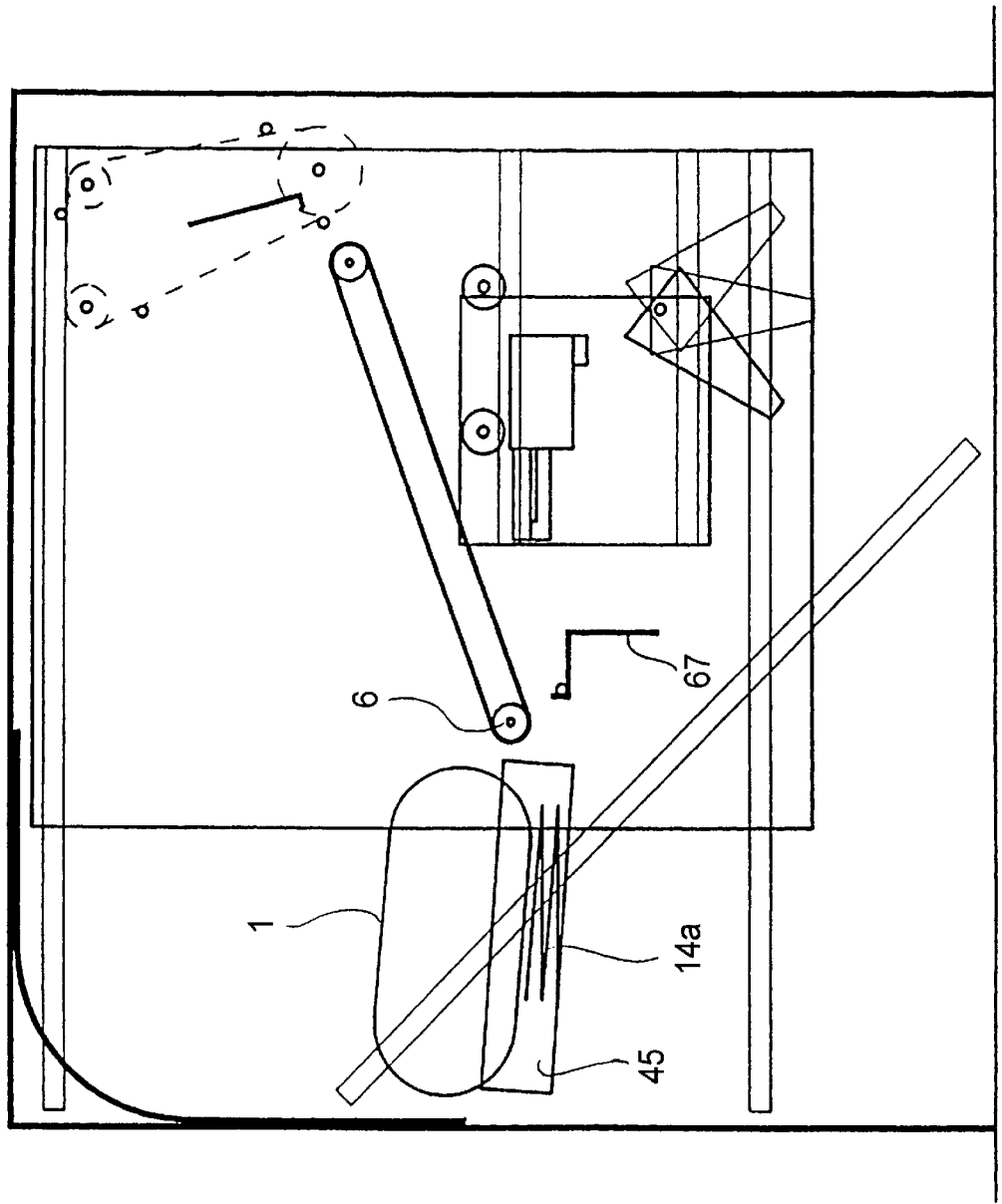

When the measuring operation is terminated the web 14 is severed by means of the severing device 64 and the plate members 55 are displaced along the track members 61 as shown in FIG. 10 so as to afford clearance for the displacement of the receptacle 45 along the track members 66. The flexible strips 5 reverse, thereby moving the bolt 1 towards the abutment plate 67. The abutment plate 67 is pivoted to the position shown in FIG. 11.

The receptacle 45 is displaced along the track members 66 until it is directly below the roller 6 in which position the strips 5 deposit the bolt 1 on the layered web 14a in the receptacle 45. The receptacle continues until it reaches the position shown in FIG. 11 whereafter the closure members 53 and 54 open the aperture and the operator may remove the bolt 1 and the layered length of web material. The apparatus is now ready for a further operational cycle.

All the operations are controlled by data processing means.

In both the embodiments shown and described, web material length identification means (not shown) are provided, said means comprising printing means communicating with the programmable data processing means to print the length, web material type, unitary price and total price of the severed length of web material on a tamper-evident label and affix the label to the severed length of web material before the receptacle 45 is presented to the customer for removal of the layered web material. A practical identification for payment purposes is hereby achieved and it prevents fraud involving for instance processing two differently priced orders, exchanging the labels and only carrying the most expensive but cheapest priced order past the cash register.

Likewise, in both embodiments, remote sensing means communicating with the programmable data processing means may be provided adjacent the inclined plate 9. Each roll of web material is in such case provided with a programmable electronic element located on the core or on the terminal end of the web material in rolls without cores. The electronic element is placed at the same end on all rolls in relation to the orientation of the free web material end and it is programmed with identification data comprising web material type, web material price and original total length of web material in the roll before being affixed to the roll. When a customer selects the roll for purchasing a length of web material therefrom he or she carries it to the apparatus and places it therein. The remote sensing means senses the location of the electronic element and will emit a signal to a display located adjacent the roll insertion aperture of the apparatus if said location indicates that the roll has been placed incorrectly on the unwinding surface 5 so that the free material end of the roll is oriented away from the conveying direction of the flexible strips 5. The display will then instruct the customer to remove the roll and turn it around before inserting it again.

The remote sensing means will also sense the identification data and transmit same to the programmable data processing means. Hereby the database of said data processing means will receive information enabling the data processing means inter alia to:

1) compute remaining length on the roll by subtracting lengths registered in said database as being previously dispensed,
2) determine whether said remaining length is sufficient to fill the order which the customer registers on a key board provided on the exterior surface of the apparatus,
3) indicate on the display whether the order can be fulfilled and perhaps indicate a special price for the remaining length after the order has been fulfilled if said remaining length is less than the minimum length to be kept in stock,
4) compute the price of the length to be severed,
5) activate the printing means to print the corresponding label,
6) up-date the book-keeping system, the stock inventory system and the stock replenishing system,
7) notify the sales personnel that processed rolls should be emptied from the apparatus when a predetermined amount of such have been processed, and
8) notify the sales personnel that a customer requires a length of web material of a type requiring assistance for manual dispensing due to the web material being unsuited for mechanical dispensing.

Figure 12:
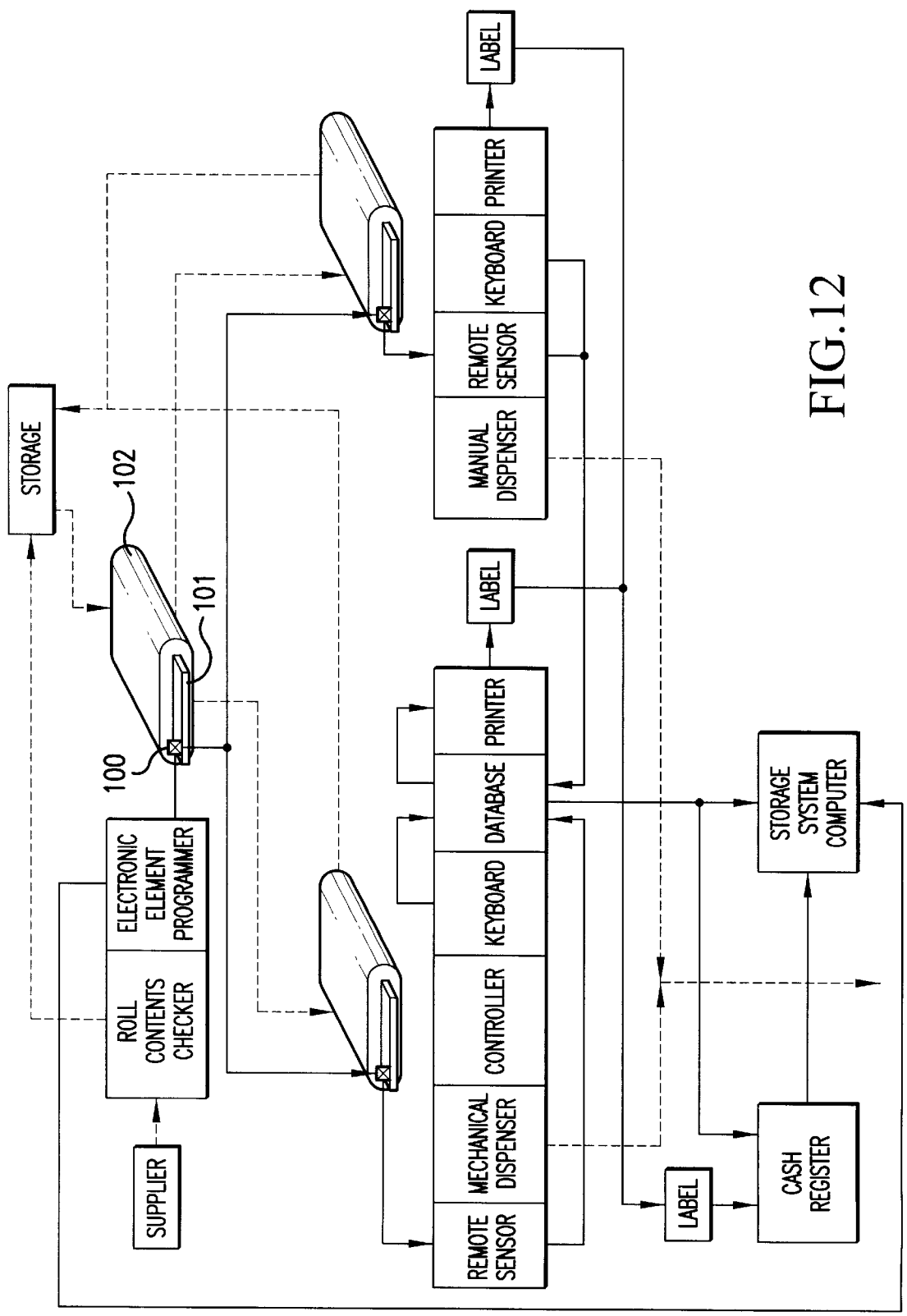
FIG. 12 is a flow diagram illustrating the flow of the web material and of the identification data between the different elements of the apparatus according to the invention.

Referring to the flow diagram shown in FIG. 12 the flow of the web material and the rolls of same are indicated by broken lines while the flow of data is indicated by uninterrupted lines. Rolls of web material are stored and displayed in the Storage, wherefrom the customers choose one or more rolls and carry them either to a Mechanic Dispenser, for instance comprising the apparatus according to FIGS. 1–3 or 6–11 or to a Manual Severing Station. When the rolls of web material arrive from the suppliers it is necessary to check the contents of the rolls by means of a Roll Contents Checker, for instance of the type weighing one unit of the length of the web material and computing the length of web material on the roll by weighing the roll and deducting the weight of the core, if any, in the roll. The Roll Contents Checker is associated with an Electronic Element Programmer for programming a programmable electronic element 100 with information regarding the type of material, the unitary price of same and the length of web material in the roll when it was received from the supplier. The element 100 is affixed to a core 101 of a roll or bolt 102 of web material taking care to affix it to the same end on all rolls in relation to the unwinding direction of the web material off the rolls.

After being processed at the Roll Contents Checker the rolls are transferred to the storage. The customers choose a roll and carry it to a Mechanical Dispenser which for instance may be the apparatus shown in FIGS. 1–3. The customer places the roll in the mechanical Dispenser and types the length of web material desired on a keyboard associated with the Mechanical Dispenser. The Mechanical Dispenser is further associated with a Remote Sensor for sensing the information programmed in the Electronic Element and transmitting said information to a Storage System Computer and a Database. The Remote sensor further senses the location of the Electronic Element in the Mechanical Dispenser, and if the roll has been inserted with the wrong orientation for the unwinding of the web material from the roll a display (not shown) will instruct the customer to remove the roll and turn it around before inserting it again. A Controller for controlling the operation of the Mechanical Dispenser and for communicating with the Storage System Computer is also associated with the Mechanical Dispenser. A Printer controlled by the Controller is also associated with the Mechanical Dispenser for printing information on a label to be affixed on the severed length of web material as described earlier.

If the type of web material is such that it is not suited for processing in the Mechanical Dispenser, the Remote Sensor and the Storage System Computer will cause the display to indicate this fact to the customer and instruct same to await a sales clerk that has been warned by the Storage System Computer to the effect that the customer needs assistance. The sales clerk carries the roll to the Manual Dispenser and measures and severs the desired length manually while the Remote Sensor, the Keyboard and the Printer associated with the Manual Dispenser operate in essentially the same manner as the ones associated with the Mechanical Dispenser.

The severed length of web material is transported by the customer from the Mechanical or Manual Dispenser to a Cash Register where the information on the label is registered and the customer can pay and leave with the acquired web material. The Cash Register communicates with the Storage System Computer for registering that the sold web material actually has been removed from the premises. The rolls from which web material has been severed are returned to the Storage by the sales personnel.

In this manner, a comprehensive control of the storage of web material is achieved whereby restocking requirements, inventory etc. can be constantly updated with minimal human intervention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for dispensing a predetermined length of a web material from a roll of wound web material, said apparatus comprising:

a housing;

unwinding means for unwinding web material from the roll, the unwinding means comprising an unwinding surface for reception and support of the roll, and unwinding conveying means for unwinding web material from the roll when positioned on the unwinding surface with the roll axis transversely to a conveying direction of the unwinding conveying means;

severing means for separating web material from the roll; and conveying means for capturing a leading free end of unwound web material hanging by gravity downstream from said unwinding surface and for conveying said unwound web material from the unwinding means to the severing means, said conveying means including:

a pivotable frame pivotally attached to said housing and pivotable about a first pivot axis;

rotary measuring means attached to said pivotable frame for automatically engaging the web material and for measuring a predetermined length of web material conveyed to the severing means;

a rocker arm pivotally attached to said pivotable frame and pivotable about a second pivot axis;

pressure means attached to said rocker arm for pressing the web material against the rotary measuring means and for automatically bringing the unwound web material into forced operating engagement with the rotary measuring means so that the predetermined length of unwound web material can be automatically conveyed to the severing means, the severing means and the conveying means being adapted to cooperate with the rotary measuring means, so that the predetermined length of web material can be separated from the roll, said pressure means being displaceable from a first position to a second position, said rotary measuring means and said pressure means being spaced-apart and located on opposite sides of a path of the leading free end of the unwound web material hanging by gravity downstream from said unwinding surface when said rotary measuring means and said pressure means are in said first position, and said pressure means pressing the unwound web material against said rotary measuring means when said rotary measuring means and said pressure means are in said second position;

sensing means for sensing the presence of the leading free end of the unwound web material in said path;

displacing means for pivoting said rocker arm about said second pivot axis to move said pressure means from said first position to said second position to capture the leading free end of the unwound web material between said pressure means and said measuring means, and for pivoting said pivotable frame about said first pivot axis to move said measuring means together with said pressure means to a third position spaced horizontally downstream from said unwinding surface; and control means for actuating said displacing means to displace said pressure means from said first position to said second position upon detection of the leading free end of the unwound web material in said path by said sensing means, and to displace said pivotable frame about said first pivot axis to move said measuring means together with said pressure means to said third position.

2. The apparatus according to claim 1, further comprising restraining means located adjacent to the unwinding surface for restraining movement of the roll.

3. The apparatus according to claim 2, wherein the restraining means are arranged to interact intermittently with the roll.

4. The apparatus according to claim 3, wherein the restraining means comprise at least one influencing element arranged to intermittently intersect the path of the roll conveyed by the unwinding conveying means.

5. The apparatus according to claim 4, wherein at least one of said at least one influencing element is arranged for movement in a closed trajectory positioned such that the movement of the influencing element at a point of the trajectory intersecting the path of a roll conveyed by the unwinding means has a vertical component.

6. The apparatus according to claim 2, wherein the restraining means comprise inhibiting means inhibiting movement of the roll in the conveying direction of the unwinding conveying means.

7. The apparatus according to claim 2, wherein the restraining means comprise influencing means influencing the roll in a direction generally opposite the conveying direction of the unwinding conveying means.

8. The apparatus according to claim 7, wherein the influence on the roll by the influencing means has a vertical component.

9. The apparatus according to claim 1, wherein the unwinding surface constitutes at least a part of the unwinding conveying means.

10. The apparatus according to claim 1, wherein there is provided, downstream from the unwinding surface, at least one roller and means to influence the web material in a direction selected from the group consisting of a direction against at least one first portion of the cylindrical surface defined by the rotation of the surface of the roller, and a direction away from at least one second portion of the cylindrical surface.

11. The apparatus according to claim 1, wherein the pressure means are rotatable about an axis of rotation parallel to an axis of rotation of the rotary measuring means.

12. The apparatus according to claim 1, wherein at least a portion of the unwinding surface is inclined upwards in the conveying direction of the unwinding conveying means.

13. The apparatus according to claim 12, wherein the surface of the unwinding conveying means engaging the web material and the roll have a configuration adapted for frictionally engaging the web material.

14. The apparatus according to claim 12, wherein the unwinding conveying means comprise a plurality of spaced, flexible endless strips having an upper portion extending along and defining the unwinding surface and extending around and engagingly cooperating with a first roller and a second roller, the first roller defining an upstream edge of the unwinding surface, the second roller defining a downstream edge of the unwinding surface, the surface of the flexible strips facing the web material having a configuration adapted to frictionally engage the web material.

15. The apparatus according to claim 14, further comprising means to influence the web material in a direction selected from the group consisting of
a direction against at least one first portion of a cylindrical surface defined by the rotation of the surface of the second roller, and
a direction away from at least one second portion of said cylindrical surface.

16. The apparatus according to claim 15, wherein the second roller is hollow and is provided with apertures forming a connective passage with at least one region in the interior thereof, said region connecting with means for changing the air pressure in that region.

17. The apparatus according to claim 16, wherein the second roller is rotatably journalled on a fixed hollow inner cylinder provided with sealing means extending parallel to the rotary axis of the second roller and sealingly engaging the inner surface of the second roller, said sealing means defining at least one first region and at least one second region between the inner surface of the second roller and the outer surface of the inner cylinder, the inner cylinder having sealing means in the interior thereof defining at least one third region and at least one fourth region, the third region connecting with the first region through apertures in the inner cylinder, the fourth region connecting with the second region through further apertures in the inner cylinder, the inner cylinder further being closed at each end by closure members, at least one of said closure members having at least one first aperture and at least one second aperture, the first aperture connecting the third region with suction means, and the second aperture connecting the fourth region with blowing means.

18. The apparatus according to claim 1, wherein a vertical space is defined between two vertical planes substantially perpendicular to the horizontal component of the conveying direction of the unwinding conveying means in a region downstream from the unwinding surface, the conveying speed of the web material upstream from said vertical space being controlled in such a manner with relation to the conveying speed of the web material downstream from the vertical space that a buffer bulge of web material is formed and maintained in the vertical space.

19. The apparatus according to claim 18, wherein the rotary measuring means comprise means for measuring the peripheral movement of the rotary measuring means.

20. The apparatus according to claim 18, wherein the sensing means are adapted to activate controlling means for controlling the conveying speed of the web material upstream from the vertical space.

21. The apparatus according to claim 18, wherein the sensing means are adapted to activate controlling means for controlling the speed of the web material downstream from the vertical space.

22. The apparatus according to claim 1, wherein the rotary measuring means comprise an electrical pulse generator for generating an electrical pulse each time the rotary measuring means has rotated through a certain angle.

23. The apparatus according to claim 1, further comprising layering means located downstream from the rotary measuring means for depositing the web material in layers in a receptacle, the layering means comprising at least one displacing element for displacing a vertical portion of the web material in a substantially horizontal direction substantially at right angles to the transverse dimension of the web material.

24. The apparatus according to claim 23, further comprising receptacle displacing means for displacing the receptacle from a first folding position substantially vertically below the layering means to a second emptying position at a height which allows for manual emptying thereof.

25. The apparatus according to claim 1, further comprising roll measuring means for measuring the amount of web material in the roll.

26. The apparatus according to claim 1, further comprising programmable data processing means.

27. The apparatus according to claim 1, further comprising web material roll identification means for identifying each roll, the roll identification parameters including at least one of the group of identification parameters comprising web material type, web material price and the length of the web material originally in the roll.

28. The apparatus according to claim 27, wherein the identification means comprise:
a programmable electronic element fixedly attached in a predetermined position on each particular roll;
means to program said electronic element with at least one of the roll identification parameters;
remote sensing means to remotely sense the electronic element for sensing the programmed roll identification parameters and the position of the electronic element means to indicate incorrect positioning of the roll on the unwinding surface based on the position of the electronic element; and
transmission means to transmit the sensed roll identification parameters to programmable data processing means.

29. The apparatus according to claim 28, further comprising manual operating means for manually measuring and severing lengths of web material.

30. The apparatus according to claim 29, wherein the manual operating means comprise:
input means for manually registering the longitudinal dimension of the length of web material severed from the roll;
remote sensing means to remotely sense the electronic element for sensing the roll identification parameters;
transmission means to transmit the sensed roll identification parameters to the programmable data processing means; and
printing means for printing identification parameters comprising at least one of the group of identification parameters comprising web material type, web material unitary price, dimension of the length of severed web material and the total price of the length of severed web material.

31. The apparatus according to claim 1, further comprising:
   input means for manually registering the longitudinal dimension of the length of web material to be severed from the rolls; and
   display means for displaying information, the information at least comprising an indication as to whether the roll contains said required length of web material.

32. The apparatus according to claim 1, further comprising web material length identification means for identifying each severed length of web material.

33. The apparatus according to claim 32, wherein the web material length identification means comprise printing means for printing web material length identification parameters comprising at least one of the group of identification parameters comprising web material type, web material unitary price, dimension of the length of severed web material and the total price of the length of severed web material.

34. The apparatus according to claim 33, wherein the web material length identification means further comprise:
   printing means for printing on tamper-evident labels; and
   means for attaching the labels to the severed lengths of web material.

35. The apparatus according to claim 1, further comprising a stock controlling system for a stock of the web material wound on rolls, said system comprising at least one programmable data processing means comprising a database and communicating with and receiving data from data input and generating means associated with at least one of:
   roll content checking means,
   dispensing means for dispensing individually predetermined lengths of the web material from the rolls,
   a cash register for recording sales of said lengths of web material, and
   a stock replenishing order placement system for ordering new supplies of web material.

36. The apparatus according to claim 1, wherein said rotary measuring means is located below said unwinding conveying means when in said first position.

37. The apparatus according to claim 1, wherein a portion of said conveying means is located below said unwinding conveying means.

38. The apparatus according to claim 1, further comprising a motor for rotatably driving said rotary measuring means.

39. An apparatus for dispensing a predetermined length of a web material from a roll of wound web material, said apparatus comprising:
   unwinding means for unwinding web material from the roll, the unwinding means comprising an unwinding surface for reception and support of the roll, and unwinding conveying means for unwinding web material from the roll when positioned on the unwinding surface with the roll axis transversely to a conveying direction of the unwinding conveying means;
   separating means for separating web material from the roll;
   conveying means for conveying unwound web material from the unwinding means to the separating means;
   rotary measuring means for automatically engaging the web material and for measuring a predetermined length of web material conveyed to the separating means;
   pressure means for pressing the web material against the rotary measuring means and for automatically bringing the unwound web material into forced operating engagement with the rotary measuring means so that the predetermined length of unwound web material can be automatically conveyed to the separating means, the separating means and the conveying means being adapted to cooperate with the rotary measuring means, so that the predetermined length of web material can be separated from the roll; and
   restraining means located adjacent to the unwinding surface for restraining movement of the roll, the restraining means comprising inhibiting means inhibiting movement of the roll in the conveying direction of the unwinding conveying means, the restraining means arranged to interact intermittently with the roll, the restraining means comprising at least one influencing element arranged to intermittently intersect the path of the roll conveyed by the unwinding conveying means,
   wherein the at least one influencing element comprises at least one rod which is longer than the maximum possible width of the web material.

40. An apparatus for dispensing a predetermined length of a web material from a roll of wound web material, said apparatus comprising:
   unwinding means for unwinding web material from the roll, the unwinding means comprising an unwinding surface for reception and support of the roll, and unwinding conveying means for unwinding web material from the roll when positioned on the unwinding surface with the roll axis transversely to a conveying direction of the unwinding conveying means;
   separating means for separating web material from the roll;
   conveying means for conveying unwound web material from the unwinding means to the separating means;
   rotary measuring means for automatically engaging the web material and for measuring a predetermined length of web material conveyed to the separating means;
   pressure means for pressing the web material against the rotary measuring means and for automatically bringing the unwound web material into forced operating engagement with the rotary measuring means so that the predetermined length of unwound web material can be automatically conveyed to the separating means, the separating means and the conveying means being adapted to cooperate with the rotary measuring means, so that the predetermined length of web material can be separated from the roll;
   layering means located downstream from the rotary measuring means for depositing the web material in layers in a receptacle, the layering means comprising at least one displacing element for displacing a vertical portion of the web material in a substantially horizontal direction substantially at right angles to the transverse dimension of the web material; and
   receptacle displacing means for displacing the receptacle from a first folding position substantially vertically below the layering means to a second emptying position at a height which allows for manual emptying thereof,
   wherein the displacement path of the receptacle between said first position and said second position is such that the roll may be deposited in the receptacle when the conveying direction of the unwinding conveying means is reversed after a separation operation.

41. The apparatus according to claim 40, further comprising a housing, and wherein said conveying means comprises a sliding frame slidably attached to said housing and supporting said rotary measuring means.

* * * * *